United States Patent Office 3,606,947
Patented Sept. 21, 1971

3,606,947
SUSPENSION CONCENTRATION-DEHYDRATING
APPARATUS
Shigemasa Tanaka and Hidetomo Suzuki, Tokyo-to,
Japan, assignors to Ebara Infilco Kabushiki Kaisha,
Tokyo-to, Japan
Filed Sept. 5, 1969, Ser. No. 855,526
Claims priority, application Japan, Sept. 17, 1968,
43/80,594; Jan. 1, 1969, 44/3,265
Int. Cl. B01d 33/06
U.S. Cl. 210—403
3 Claims

ABSTRACT OF THE DISCLOSURE

Proposed in the present invention is a concentration-dehydrator apparatus comprising means for precipitating the solids in the suspension, and means for separating and dehydrating the solids from the suspension and turning said solids into a cake-like mass by utlizing variation of properties of the suspended solids in a rotary cylindrical container and the difference of movements between the suspended solids and the liquid in said container, with no need of subjecting the precipitate to centrifugal separation, vacuum filtering or pressure filtering process.

SUMMARY OF THE INVENTION

This invention relates to a concentration-dehydrating apparatus for effecting separation of the solid and liquid in a suspension.

Conventionally, solid-liquid separation from a suspension has been conducted by first precipitating the solids according to either spontaneous precipitation or aggregation precipitation, and then subjecting the precipitates to a centrifugal separator, vacuum filter, pressure filter or other like means to thereby dehydrate the precipitates. These means, however, involve complicated and expensive equipments such as a vacuum or pressure hydro-extractor or other filter devices which are difficult in mechanical operation and maintenance and are also costly for their manufacture.

The present invention is designed to eliminate these and other defects inherent to the conventional devices and to make it possible to achieve concentration dehydration of the suspended substances including fine particles with ease and with an extremely simple mechanism and to also turn the suspended substances in the liquid directly into granular or cake-like masses and guide them out in separation from the liquid.

To accomplish the above-said object, there is provided according to the present invention a suspension concentration-dehydrating apparatus comprising a rotary cylindrical container which is held substantially horizontally and in which a suspension added with a coagulant is disposed, means are present for giving rolling motion to the suspended solids in said cylindrical container so as to convert said solids into a granular agglomeration or a mass, and means are provided for separating the cakes and the liquid by utilizing the motional difference between the produced massy solids and the liquid in the container while transferring them from the one end to the other end of said rotary cylindrical container.

The concentration dehydrating apparatus of the present invention is also featured by its structural arrangement in which the cylindrical container having at its one end a suspension flow inlet and at its other end a cake outlet is rotatable provided, and a partition wall is provided adjacent the cake outlet in the inside of said rotary container to thereby divide the interior of said container into a suspension transferring section $a$ and a liquid separating section $b$, with a transferring means doubling as a partition being provided on the inner peripheral wall of said suspension transferring section, with a discharge port being opened at a part of said partition wall, and with a liquid outflow port being opened at a part of the inner peripheral wall of the liquid separating section on the rotating side of said discharge port, and there is also provided a cake extracting portion in the liquid separating section.

Thus, according to the present invention having the just described construction, it is possible to positively give solid-precipitating action as well as rolling motion to the suspension flowing in the rotary cylindrical container, thus assuring effective separation and extraction from the liquid the suspended material therein in the form of granular or massy cakes having high dehydrability.

The present invention is also featured by the fact that concentration, separation and dehydration of the suspended material in the suspension can be effectively accomplished in a single rotary cylindrical container, resulting in appreciable simplification of the structure and its operational management, and also transportation, burying and other after treatments of the cakes can be easily and economically performed.

Further, according to the present invention, the difference in motion of the liquid and the solids is utilized to reduce the suspension in the rotary cylindrical container into a granular aggregation or masses, thereby expediting concentration and solid-liquid separation while allowing for easy and economical dehydrating operation as well as improvement of treating capacity, whereby the defects and drawbacks of the conventional devices are most rationally overcome.

Moreover, the present invention permits continuous treating operation with a single rotary cylindrical container, in which the suspension can be successively fed without interruption. The treating operation is safe and simplified, and also the manufacture of the apparatus is easy and low in cost.

Now, the invention will be discussed in more detail with reference to the accompanying drawings embodying the present invention, in which.

Figure 1:
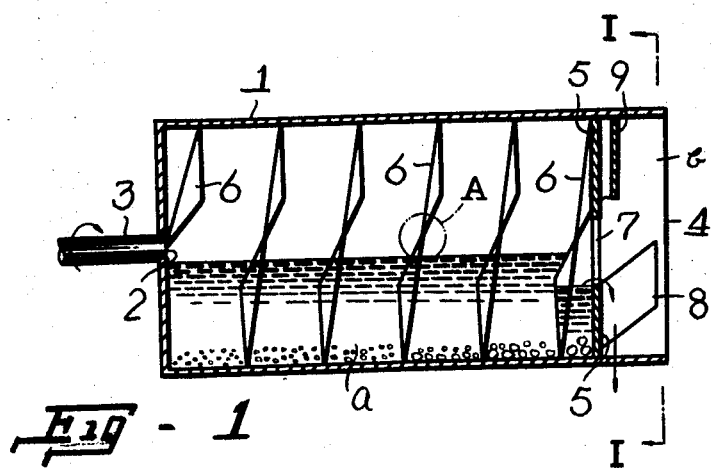
FIG. 1 is a general sectional side view of the entire apparatus according to the present invention.
Figure 2:
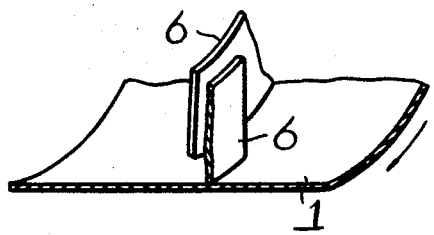
FIG. 2 is an enlarged perspective view of a portion A of FIG. 1.

Referring first to FIGS. 1 and 2, there is shown a rotary container generally designated with numeral 1 and arranged such that a suspension liquid with an added high molecular coagulant is supplied thereinto and rotated so as to give rolling motion to the suspended material in the liquid, thereby to reduce the suspended material in the liquid directly into granular or massy agglomerations which are then separated from the liquid. Said container 1 is composed of a circular or polygonal cylindrical rotary container having its rotation axis kept substantially horizontally. It will be seen that said container has at its one end a suspension inlet port 2 which is fittedly connected to a supply pipe 3, and at the other end of said container there is formed a discharge opening 4 for the granular or massy suspended material (cakes). Inside the rotary container 1 and adjacent the cake discharge opening 4 is provided a partition wall 5 whereby the interior of the container is divided into a suspension transferring section $a$ and a liquid separating section $b$.

On the inner peripheral wall of said transferring section $a$ are provided spiral transferring plates 6 which double as partition plates. These transferring plates 6 are each cut into a suitable length and disposed in a discontinuous or staggered arrangement, as exemplified in FIG. 2. At a part of the outer periphery of the partition wall 5 there is formed a discharge opening 7, and in the inner peripheral wall of the separating section $b$ there is formed a liquid outflow opening 8 disposed on the rotating side of said discharge opening 7. There is also provided a cake extracting plate 9 inclined low in the rotating direction.

This extracting plate 9 may be of any desired configuration, with a screen being spread over the outflow opening 8, or such plate 9 may not be provided and instead the separating section $b$ may be shaped like a drill so as to permit the cakes to be guided out. Also, if need be, the entire configuration of the rotary container 1 may be shaped like a drill.

Thus, the suspension, after having added thereto a high molecular coagulant, is supplied through the supply pipe 3 and fed into the transferring section $a$ of the container from its inlet opening 2. The suspended materials, which have begun to be coagulated and separated in the liquid, are forced to effectuate a rolling motion along the inner wall of the container in accordance with rotation of said container 1, and during continuation of such rolling motion, the suspended materials are gradually turned from the flock-like state into stronger and larger granular or massy (agglomerated) cakes and are successively transferred by the transferring plates 6 toward the partition wall 5.

Figure 3:
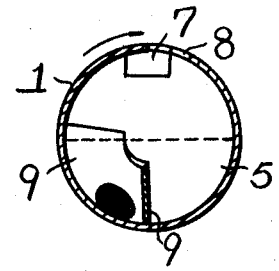
FIGS. 3 through 6 are reduced sectional views as taken along the line I—I of FIG. 1, each illustrating the respective operational process.
Figure 4:
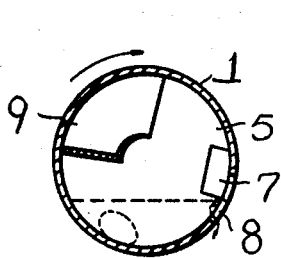
Figure 5:
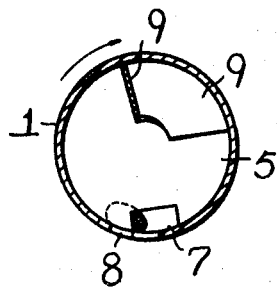
Figure 6:
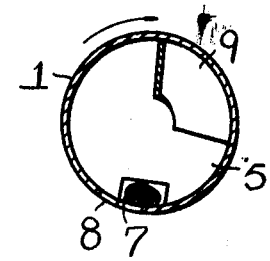

They are then forwarded through the discharge opening 7 of the partition wall 5 into the separating section $b$ where the liquid is separated from the cakes and discharged through the outflow opening 8. It will be apparent that when the discharge opening 7 is brought up to the top of the rotary container 1 by rotation thereof, as shown in FIG. 3, the liquid in the transferring section $a$ is not discharged into the separating section $b$ and is retained in the manner shown by a dotted line, but when the discharge opening 7 is moved downward in accordance with rotation of the container 1, as shown in FIG. 4, the liquid comes to be discharged through the discharge opening 7 into the separating section $b$ and also discharged through from the outflow opening 8. It will be noted that the liquid alone is discharged since the cakes are precipitated. When the container 1 is further turned until the discharge opening 7 reaches near the lowermost part as shown in FIG. 5, the liquid is now almost entirely discharged, leaving the cakes alone in the container. When the position shown in FIG. 6 is reached, the cakes are discharged into the separating section $b$ through the discharge opening 7 by means of the transferring plates 6, but in this position, the outflow opening 8 is blocked, so that the cakes are retained on the wall, and with rotation of the container 1, the cakes are moved by rolling on the plate 9 from its base and guided outside axially. In this manner, the liquid is separated and flown out downwardly, while the cakes are guided out axially of the container. Thus, according to the present invention, the suspended materials in the liquid are concentrated directly into granular or massy aggregations and guided out in that form.

We claim:

1. A suspension concentration-dehydrating apparatus comprising a cylinder having a peripheral wall, a closed end and an open end, said cylinder having a generally horizontal longitudinal axis and being rotatable in a direction about said axis, an inlet opening through said closed end, a partition wall within said peripheral wall transversely of said axis dividing said cylinder in to a suspension transferring section (a) and a liquid separating section (b), a discharge opening in said partition wall adjacent said peripheral wall, a liquid overflow opening in said peripheral wall on said liquid separating section side of said partition wall, said liquid outflow opening being generally ahead of said discharge opening in said direction of rotation, a cake extracting plate in said liquid separating section behind said discharge opening in said direction of rotation, and means in said suspension transferring section for transferring said suspension from said inlet opening to said discharge opening as said cylinder is rotated in said direction.

2. A suspension concentration-dehydrating apparatus as claimed in claim 1 wherein said transferring means includes a plurality of spirally positioned spaced plates carried by said peripheral wall.

3. A suspension concentration-dehydrating apparatus as claimed in claim 2 wherein said spaced plates are imperforate.

References Cited

UNITED STATES PATENTS 3,193,927  7/1965  Ubbels et al. _____ 210—403X

JAMES L. DE CESARE, Primary Examiner